3,381,006
CERTAIN β-SUBSTITUTED-α-(4,5-DIMETHOXY-2-NITROPHENYL) ACRYLONITRILES AND 2-AMINOPHENYL DERIVATIVES THEREOF
John T. Suh, Mequon, Wis., assignor to McNeil Laboratories, Incorporated, a corporation of Pennsylvania
No Drawing. Filed Oct. 5, 1964, Ser. No. 401,635
7 Claims. (Cl. 260—240)

ABSTRACT OF THE DISCLOSURE

The compounds of this invention are of the type of β - (heterocyclic substituted) - α - (4,5 - dimethoxy - 2 - nitrophenyl)acrylonitriles and β-(heterocyclic substituted)-α-(4,5-dimethoxy-2-aminophenyl)acrylonitriles, in which the heterocyclic members are pyrrolyl, N-loweralkylpyrrolyl and N-loweralkyl-piperidyl. The compounds are useful as ultraviolet absorbers.

---

This invention relates to a new series of compounds. More particularly it concerns certain β-substituted-α-(4,5-dimethoxy-2-nitrophenyl) acrylonitriles and certain β-substituted - α - (4,5 - dimethoxy - 2 - aminophenyl) acrylonitriles which may be represented as follows:

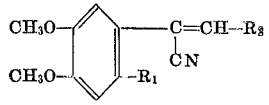

In the above formula $R_1$ stands for nitro or amino; $R_2$ stands for halophenyl, alkylphenyl, cyanophenyl, carboxyphenyl, aminophenyl, loweralkylaminophenyl, di-loweralkylaminophenyl, halomethylphenyl, loweralkylaminophenyl, aminoloweralkylphenyl, loweralkyl-carbonylamino-loweralkyl-oxy-phenyl, cyclohexyl, or heterocyclic aryl groups comprising five to ten membered heteroaromatics wherein the hetero atoms are one or more of thia, aza or oxa atoms, including monocyclic heteroaryls comprising five to six members having at least one sulfur, nitrogen or oxygen atom as the heteroatom, and bicyclic heteroalkyls having up to ten members and having, as one of the cyclic moieties, a five-to-six membered heteroaromatic ring with at least one sulfur, nitrogen or oxygen atom, and including specifically pyridyl, quinolyl, imidazolyl, pyrazinyl, pyrrolyl, thienyl, furyl, thiazolyl, thiadiazolyl, pyrazolyl, oxazolyl, pyrimidinyl, and N-alkylated derivatives thereof. Acid addition salts, such as the hydrochloride, fumarate, maleate and hexamate and loweralkyl quaternary ammonium derivatives of those β-substituted acrylonitriles containing a basic nitrogen in the $R_2$ position are also included in the invention.

Compounds of the structure represented by the formula wherein $R_1$ is nitro are prepared by condensing 4,5-dimethoxy-2-nitrophenyl acetonitrile with an aldehyde selected from the group consisting of halophenyl, cyclohexyl, aminophenyl, loweralkylaminophenyl, di-loweralkyl-aminophenyl, loweralkyl-carbonylamino-lower alkyl, cyanophenyl, trihalomethylphenyl, thienyl, furyl, pyrrolyl, oxyphenyl, pyridyl, and N-loweralkyl piperidyl aldehydes in the presence of a catalytic amount of piperidine.

Compounds of the structure represented by the formula wherein $R_1$ is amino are prepared by hydrogenating the β-substituted-α-(4,5-dimethoxy-2-nitrophenyl) acrylonitriles at room temperature in the presence of 10 percent palladium on carbon, using ethyl acetate as the solvent for the reaction. Other suitable methods for the reduction of the nitro group to the amino group may be employed.

As used herein, pyridyl represents 2-pyridyl, 3-pyridyl or 4-pyridyl. In the same manner, N-loweralkylpiperidyl represents 2-N-loweralkylpiperidyl, 3-N-loweralkylpiperidyl and 4-N-loweralkylpiperidyl.

As used herein, loweralkyl may be straight or branch chained and have from 1 to 4 carbon atoms, such as, for example, methyl, ethyl, propyl, isopropyl, butyl, isobutyl, tertiary butyl and the like.

The compounds of this invention absorb ultraviolet light and are useful as sun-screening materials in salves and ointments. In addition, because of their solubility in organic materials generally, they may be used as ultraviolet absorbers in plastics and resins, such as polystyrene, polyethylene, polypropylene, polyacrylics (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultraviolet light, such as in plastic film or light filters. The absorber may be incorporated in the mixtures of monomers before polymerization to form the polymer or it may be incorporated in the polymer at any stage during its handling, as by milling into the polymer together with other compounding ingredients or during the spinning of polymers into fibers, etc.

The novel compounds of this invention are also useful as intermediates in the preparation of novel indoles by reductive cyclization. The reductive cyclization of the 3-substituted-4,5-dimethoxy-2-nitrophenyl acrylonitriles is desirably achieved by adding iron powder to a refluxing solution of the nitrile in a glacial acetic acid and allowing the reaction mixture to reflux for 2 to 5 hours. The solvent is distilled under diminished pressure and the crude product is purified by recrystallization. The elemental analyses as well as ultraviolet absorption, infrared absorption and nuclear magnetic resonance spectra support the assignment of the indole structures described herein.

The novel compounds may be converted into the corresponding quaternary ammonium compounds by reaction of the tertiary bases with alkylating agents, i.e. alkyl or aralkyl halides or esters formed by reacting alkanols with an oxygen-containing acid such as methyl iodide, ethyl bromide, propyl chloride; lower alkenyl halides—allyl bromide; dilower alkylsulfonates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel pressure. Suitable solvents for this purpose are ethers such as diethylether and tetrahydrofuran, hydrocarbons such as benzene and heptane, ketones such as acetone and butanone, lower alkanols such as ethanol, propanol or butanol; or organic acid amides such as formamide or dimethylformamide. When lower alkyl halogenides are used as quaternizing agents, diethyl ether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono lower alkylsulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The compounds of this invention may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

The following examples are intended to illustrate, but not to limit, the scope of the invention.

Example I

A solution of 6.59 grams of 4,5-dimethoxy-2-nitrophenyl acetonitrile and 4.1 grams of 4-pyridine carboxaldehyde in 250 ml. of boiling absolute alcohol is treated with 3.13 ml. of piperidine. The solution is boiled for 2½ hours and allowed to stand at room temperature for 2 days. A yellow precipitate is obtained. The mixture is filtered and the precipitate collected to yield α-(4,5-dimethoxy-2-nitrophenyl)-β-(4-pyridyl) acrylonitrile. Melting point, 201° C.

Example II

A solution of 6 grams of α-(4,5-dimethoxy-2-nitrophenyl)-β-(4-pyridyl) acrylonitrile in about 80 ml. of glacial acetic acid is heated on a steam bath with 3.38 grams of iron powder under continuous stirring for several hours. The mixture is then filtered. The residue from filtration is mixed with water and filtered again. The aqueous filtrate is then made basic by the addition of potassium bicarbonate. The yellow precipitate is 3-cyano-5,6-dimethoxy-2-(4-pyridyl) indole. Melting point, above 310° C.

Example III

A mixture of 5 grams of α-(4,5-dimethoxy-2-nitrophenyl)-β-(4-pyridyl) acrylonitrile and 1 gram of 10 percent palladium on carbon in 150 ml. of ethyl acetate is hydrogenated at room temperature for 2½ hours. The mixture is filtered to remove the catalyst. The solution is distilled under reduced pressure to remove the solvent. The precipitate is recrystallized from methanol to yield α - (2-amino-4,5-dimethoxyphenyl)-β-(4-pyridyl) acrylonitrile, orange needles. Melting point, 181–182° C.

Example IV

To a refluxing solution of 22.5 grams of 4,5-dimethoxy-2-nitrophenyl acetonitrile in 400 ml. of absolute ethanol is added in portions a solution of 11 grams 3-pyridine carboxaldehyde in 50 ml. of absolute ethanol, and 8 ml. of piperidine. The resulting solution is allowed to reflux for 2½ hours and cooled. The bright yellow product α-(4,5-dimethoxy-2-nitrophenyl)-β-(3-pyridyl) acrylonitrile crystallizes from the solution. Melting point, 204° C.

Example V

A mixture of 5 grams of α-(4,5-dimethoxy-2-nitrophenyl)-β-(3-pyridyl) acrylonitrile and 10 percent palladium on carbon in a mixture of ethyl acetate and ethanol is shaken with hydrogen for 1 hour. The catalyst is filtered off and the filtrate is distilled in vacuo to remove the solvent. The product is α-(2-amino-4,5-dimethoxyphenyl)-β-(3-pyridine) acrylonitrile. Melting point, 130° C.

Example VI

A solution of 12 grams of α-(4,5-dimethoxy-2-nitrophenyl)-β-(3-pyridyl) acrylonitrile in approximately 90 ml. of glacial acetic acid is heated on a steam bath with 6.76 grams of iron powder under continuous stirring for several hours. The mixture is filtered and the residue is mixed with water and filtered again. Both the acetic acid filtrate and the aqueous filtrate are made basic by the addition of potassium bicarbonate. The product obtained is 3-cyano-5,6-dimethoxy-2-(3-pyridyl) indole. Melting point, 238–239° C.

Example VII

A 10 gram sample of α-(4,5-dimethoxy-2-nitrophenyl)-β-(3-pyridyl) acrylonitrile is added to 300 ml. of 1,2-dimethoxyethane containing 9.1 grams of methyl iodide. The reaction mixture is refluxed for 1 hour with stirring and filtered to give an orange precipitate of 3-(β-cyano-4,5 - dimethoxy-2-nitrostyryl)-1-methylpyridinium iodide which is recrystallized from methanol to yield yellow needles. Melting point, 206–207° C.

U.V. absorption in methanol 219 mμ (ε 29,500); 255 mμ (ε 18,200); 270 mμ (ε 16,400); 297 mu (ε 12,700).

Example VIII

To a mixture of 3 grams of 4-(β-cyano-4,5-dimethoxy-2-nitrostyryl)-1-methylpyridinium iodide in 100 ml. of methanol is added in portions 1.1 grams of sodium borohydride and the reaction mixture is allowed to stand at room temperature for 1 hour while stirring. During this period the color of the reaction mixture changes slowly from dark brown to light brown. The methanol solution is distilled in vacuo and 150 ml. of ice water is added to the residue. The water insoluble residue α-(4,5-dimethoxy-2-nitrophenyl)-β-(1,2,3,6-tetrahydro - 1-methyl - 4-pyridine) acrylonitrile is isolated by filtration and dried in air at room temperature. Melting point, 136° C.

Example IX

A mixture of 3 grams of α-(4,5-dimethoxy-2-nitrophenyl)-1,2,3,6-tetrahydro - 1-methyl - 4-pyridine-acrylonitrile and 4 grams of 10 percent palladium on carbon in 125 ml. of ethyl acetate is shaken with hydrogen for 2 hours at 70° to 80° C. The reaction mixture is filtered and the filtrate is evaporated in vacuo. The residue is crystallized from benzene to give 4-[β-(2-amino-4,5-dimethoxyphenyl)-β-cyanoethyl]-1-methylpiperidine. Melting point, 173–175.5° C.

Example X

To a warm solution of 30 grams of 4,5-dimethoxy-2-nitrophenylacetonitrile in 300 ml. of ethanol, 25 grams of p-diethylaminobenzaldehyde is added. The solution is treated with 9.45 ml. of piperidine and allowed to reflux for 6 hours. The reaction mixture is cooled and filtered to yield a bright orange precipitate. The precipitate is recrystallized from methanol to give fluffy orange plates of α-(4,5 - dimethoxy - 2-nitrophenyl)-β-(4-diethylaminophenyl) acrylonitrile. Melting point, 123–124° C.

Example XI

To a refluxing solution of 10 grams of α-(4,5-dimethoxy - 2-nitrophenyl)-β-(4-diethylaminophenyl) acrylonitrile in 250 ml. of glacial acetic acid is added in portions 2.94 grams of iron powder. The resulting reaction mixture is allowed to reflux for 2½ hours and is then filtered. The filtrate is distilled under diminished pressure. The residue is treated with 150 ml. of water, filtered and the residue and filtrate (from filtration) are treated with 100 ml. of methanol and 10 percent sodium hydroxide solution. The solid product is filtered and recrystallized from hot boiling methanol with the addition of water to yield 3-cyano-5,6-dimethoxy - 2-(p-diethylaminophenyl) indole. The hydrochloric acid addition salt is prepared by reacting 3-cyano - 5,6-dimethoxy-2-(p-diethylaminophenyl) indole with hydrogen chloride in ether. In a similar manner other acid addition salts such as the fumarate, maleate and hexamate salts are prepared by using the corresponding acid in ether solution.

Example XII

A mixture of 3.74 grams of α-(4,5-dimethoxy-2-nitrophenyl) - β - (4-diethylaminophenyl) acrylonitrile and 1 gram of 10 percent palladium on carbon in 150 ml. of ethyl acetate is hydrogenated at room temperature for 4 hours. Removal of the solvent and recrystallization of the residue from methanol gives α-(2-amino-4,5-dimethoxyphenyl)-β-(4-diethylaminophenyl) acrylonitrile. Melting point, 146–147° C.

Example XIII

A solution of 30 grams of 4,5-dimethoxy-2-nitrophenyl acetonitrile, 23 grams of p-dimethylaminobenzaldehyde and 10 ml. of piperidine in 400 ml. of methanol is allowed to reflux for 3½ hours. Upon cooling and filtering the mixture, α-(4,5-dimethoxy-2-nitrophenyl)-β-(p-dimethylaminophenyl) acrylonitrile is obtained. Melting point, 181° C.

Example XIV

To a refluxing solution of 16 grams of α-(4,5-dimethoxy-2-nitrophenyl)-β-(p-dimethylaminophenyl) acrylonitrile in 200 ml. of acetic acid is added in portions 5.1 grams of iron powder and the reaction mixture is allowed to reflux for 6 hours. The reaction mixture is filtered and the residue is washed with methanol twice to yield 3-cyano-5,6-dimethoxy-2-(p-dimethylaminophenyl) indole. Melting point, 265–266° C.

Example XV

To a warm solution of 22 grams of 4,5-dimethoxy-2-nitrophenylacetonitrile in 400 ml. of absolute ethanol is added 11 grams of pyridine-2-carboxaldehyde in 50 ml. of absolute alcohol and 8 ml. of piperidine. The reaction mixture is refluxed for 2 hours and is thereafter cooled and filtered to give α-(4,5-dimethoxy-2-nitrophenyl)-β-2-pyridylacrylonitrile. Recrystallization from ethyl acetate gives pure material. Melting point, 187–189° C.

Example XVI

To a refluxing solution of 30 grams of 4,5-dimethoxy-2-nitrophenylacetonitrile in 250 ml. of absolute methanol is added 33 grams of p-2-diethylaminoethoxybenzaldehyde and 10 ml. of piperidine. The resulting mixture is refluxed for 6 hours, cooled, filtered to yield a solid which is recrystallized from methanol to obtain β-[p-(2-diethylaminoethoxy) phenyl]-α-(4,5-dimethoxy-2-nitrophenyl) acrylonitrile. Melting point, 105° C.

Example XVII

To a refluxing solution of 20.5 grams of β-[p-(2-diethylaminoethoxy) phenyl]-α-(4,5-dimethoxy-2-nitrophenyl) acrylonitrile in 200 ml. of acetic acid is added in portions, 5.6 grams of iron powder. The reaction mixture is refluxed for 4 hours. The mixture is filtered and the filtrate is distilled in vacuo. The residue is treated with 20.0 ml. of water and 30 percent of sodium hydroxide to make the solution basic and filtered. The product obtained is 3-cyano-2-[p-(2-diethylaminoethoxy) phenyl]-5,6-dimethoxyindole which is recrystallized several times from dilute methanol. Melting point, 165° C.

Example XVIII

A solution of 15 grams of 4,5-dimethoxy-2-nitrophenyl acetonitrile and 15 grams of pyrrole-2-carboxaldehyde in about 250 ml. of absolute ethanol is treated with 7.23 ml. of piperidine under refluxing. The refluxing is continued for 1 hour. The mixture is filtered to yield a solid which is recrystallized from methanol-ethanol to give α-(4,5-dimethoxy-2-nitrophenyl)-β-(2-pyrrolyl) acrylonitrile, red crystals. Melting point, 193–194° C.

U.V. absorption in methanol: 218 mμ (ε 16,600); 247 mμ (ε 11,100); 337 mμ (ε 24,400).

Example XIX

A solution of 15 grams of 4,5-dimethoxy-2-nitrophenylacetonitrile and 9.5 grams of N-methylpyrrole-2-carboxaldehyde in about 250 ml. of absolute ethanol is treated with 7.23 ml. of piperidine and refluxed for approximately 4 hours. The mixture is filtered to yield an orange precipitate of α-(2-nitro-4,5-dimethoxyphenyl)-β-(1-methyl-2-pyrrolyl) acrylonitrile. Melting point, 182–183° C.

Example XX

A solution of 4.68 grams of 4,5-dimethoxy-2-nitrophenylacetonitrile and 3.04 grams of 2-thiophenecarboxaldehyde in approximately 79 ml. of absolute ethanol is treated with 2.25 ml. of piperidine and refluxed for about 1 hour. The reaction is cooled and filtered to give a solid which is crystallized from methanol to give α-(4,5-dimethoxy-2-nitrophenyl)-β-(2-thienyl) acrylonitrile. Melting point, 187–188° C.

Example XXI

To a hot solution of 20 grams of α-(4,5-dimethoxy-2-nitrophenyl)-β-(2-thienyl) acrylonitrile in 125 ml. of glacial acetic acid, 7.06 grams of iron powder is added. The mixture is stirred under reflux for 2 hours and 15 minutes. The reaction mixture is then filtered to yield a solid which is recrystallized from methanol to give silvery white needles of 3-cyano-5,6-dimethoxy-2-(2-thienyl) indole. Melting point 209–210° C.

Example XXII

To a warm solution of 30 grams of 4,5-dimethoxy-2-nitrophenylacetonitrile in 300 ml. of absolute ethanol, 15 grams of furfural and 9.45 grams of piperidine (catalyst) are added. The reaction solution is refluxed for 1½ hours, cooled and filtered to yield α-(2-nitro-4,5-dimethoxyphenyl)-β-(2-furyl) acrylonitrile. Melting point, 181–182° C.

U.V. absorption in methanol: 213 mμ (ε 12,200); 244 mμ (ε 12,900); 316 mμ (ε 25,600).

Example XXIII

A solution of 17.7 grams of α-(2-nitro-4,5-dimethoxyphenyl)-β-(2-furyl) acrylonitrile in 300 ml. of glacial acetic acid is stirred with 6.57 grams of iron powder under refluxing for about 2½ hours. The reaction is allowed to cool and is filtered. Evaporation of the filtrate leaves a gum which crystallizes upon treatment with water. Recrystallization of the solid from aqueous ethanol gives 3-cyano-2-(2-furyl)-5,6-dimethoxyindole. Melting point, 180–181° C.

U.V. absorption in methanol: 237 mμ (ε 19,100); 336 mμ (ε 29,400).

Example XXIV

To a refluxing solution of 10 grams of 4,5-dimethoxy-2-nitrophenylacetonitrile in 200 ml. of methanol is added in portions 7 grams of cyclohexanecarboxaldehyde and 3 ml. of piperidine. The mixture is allowed to reflux for 6 hours. The reaction mixture is cooled and the solid product precipitated is filtered and crystallized from methanol to give β-cyclohexyl-α-(4,5-dimethoxy-2-nitrophenyl) acrylonitrile. Melting point, 161° C.

U.V. absorption in methanol: 248 mμ (ε 12,400); 295, 342 mμ.

Example XXV

To a refluxing solution of 22.5 grams of β-cyclohexyl-α-(4,5-dimethoxy-2-nitrophenyl) acrylonitrile in 200 ml. of acetic acid is added in portions 8.4 grams of iron powder. The resulting mixture is refluxed for 6 hours. The reaction mixture is filtered and the filtrate is evaporated under diminished pressure to give a residue which is recrystallized from ethyl acetate-hexane to obtain 3-cyano-2-cyclohexyl-5,6-dimethoxyindole. Melting point, 137–139° C.

Example XXVI

To a warm solution of 30 grams of 4,5-dimethoxy-2-nitrophenylacetonitrile in 300 ml. of absolute ethanol, 20 grams of 4-cyanobenzaldehyde and 9.45 ml. of piperidine are added. The reaction mixture is refluxed for 3 hours. The resulting mixture is filtered to yield a bright yellow product which is crystallized from methanol to give α-(2-nitro-4,5-dimethoxyphenyl)-β-4-cyanophenyl) acrylonitrile. Melting point, 214–215° C.

U.V. absorption in methanol: 246 mμ (ε 14,200); 289 mμ (ε 26,600).

Example XXVII

A solution of 5 grams of α-(2-nitro-4,5-dimethoxyphenyl)-β-(4-cyanophenyl) acrylonitrile in 175 ml. of acetic acid is stirred with 1.66 grams of iron powder under refluxing conditions for approximately 2 hours. The reaction mixture is cooled and filtered. The solid product is recrystallized from methanol to yield 3-cyano-5,6-dimethoxy-2-(4-cyanophenyl) indole. Melting point: 283° C.

U.V. absorption in methanol: 219 mμ (ε 28,000); 242 mμ (ε 16,300); 359 mμ (ε 19,900).

Example XXVIII

To a refluxing solution of 21 grams of 4,5-dimethoxy-2-nitrophenylacetonitrile in 200 ml. of methanol is added in portions, 14 grams of p-chlorobenzaldehyde in 100 ml. of methanol and 5 ml. of piperidine. The mixture is refluxed for 4 hours. The reaction mixture is cooled and the solid product is filtered and recrystallized from methanol to give β-(p-chlorophenyl)-α-(4,5-dimethoxy-2-nitrophenyl) acrylonitrile. Melting point, 176.5–177° C.

U.V. absorption in methanol: 295 mμ (ε 25,800); 223 mμ (ε 18,700).

Example XXIX

To a refluxing solution of 24 grams of β-(p-chlorophenyl)-α-(4,5-dimethoxy-2-nitrophenyl) acrylonitrile in 200 ml. of glacial acetic acid is added in portions 8 grams of iron powder. The reaction mixture is refluxed for 3 to 4 hours, cooled and then filtered. The residue is washed with hot methanol and boiling water and crystallized from methanol to give 3-cyano-2-(p-chlorophenyl)-5,6-dimethoxyindole. Melting point, 284–285° C.

U.V. absorption in methanol: 331 mμ (ε 22,000); 236 mμ (ε 24,800).

Example XXX

A mixture of 10 grams of β-(p-chlorophenyl)-α-(4,5-dimethoxy-2-nitrophenyl) acrylonitrile and 1 gram of palladium on carbon in 175 ml. of 1,2-dimethoxyethane is shaken with hydrogen at room temperature. The theoretical amount of hydrogen is taken up within 2 hours. The reaction mixture is filtered. The filtrate is evaporated in vacuo and the residue is triturated with petroleum ether and ethanol. A bright orange product, α-(2-amino-4,5-dimethoxyphenyl)-β-(p-chlorophenyl) acrylonitrile is obtained which is crystallized from benzene. Melting point, 112–115° C.

Example XXXI

Using the procedure of Example XXVIII and replacing the p-chlorobenzaldehyde with an equivalent amount of p-aminobenzaldehyde, the product recovered is β-(p-aminophenyl)-α-(4,5-dimethoxy-2-nitrophenyl) acrylonitrile.

Example XXXII

Using the procedure of Example XXIX and replacing the β-(p-chlorophenyl)-α-(4,5-dimethoxy-2-nitrophenyl) acrylonitrile with an equivalent amount of β-(p-aminophenyl)-α-(4,5-dimethoxy-2-nitrophenyl) acrylonitrile, the product recovered is 3-cyano-2-(p-aminophenyl)-5,6-dimethoxyindole.

Example XXXIII

Using the procedure of Example XXVIII and replacing the p-chlorobenzaldehyde with an equivalent amount of p-methylaminobenzaldehyde, the product recovered is β-(p-methylaminophenyl)-α-(4,5-dimethoxy-2-nitrophenyl) acrylonitrile.

Example XXXIV

Using the procedure of Example XXIX and replacing the β-(p-chlorophenyl)-α-(4,5-dimethoxy-2-nitrophenyl) acrylonitrile with an equivalent amount of β-(p-methylaminophenyl)-α-(4,5-dimethoxy-2-nitrophenyl) acrylonitrile, the product recovered is 3-cyano-2-(p-methylaminophenyl)-5,6-dimethoxyindole.

Example XXXV

Using the procedure of Example XXVIII and replacing the p-chlorobenzaldehyde with an equivalent amount of p-trifluoromethylbenzaldehyde, the product recovered is β-(p-trifluoromethylphenyl)-α-(4,5-dimethoxy-2-nitrophenyl) acrylonitrile.

Example XXXVI

Using the procedure of Example XXIX and replacing the β-(p-chlorophenyl)α-(4,5-dimethoxy-2-nitrophenyl) acrylonitrile with an equivalent amount of β-(p-trifluoromethylphenyl)-α-(4,5-dimethoxy-2-nitrophenyl) acrylonitrile the product recovered is 3-cyano-2-(p-trifluoromethylphenyl)-5,6-dimethoxyindole.

Example XXXVII

Using the procedure of Example III and replacing the α-(4,5-dimethoxy-2-nitrophenyl)-β-(4-pyridyl) acrylontrile with an equivalent amount of one of the following:

α-(4,5-dimethoxy-2-nitrophenyl)-β-(3-pyridyl) acrylonitrile
α-(4,5-dimethoxy-2-nitrophenyl)-β-(2-pyridyl) acrylonitrile
α-(4,5-dimethoxy-2-nitrophenyl)-β-(dimethylaminophenyl) acrylonitrile
α-(4,5-dimethoxy-2-nitrophenyl)-β-[p-(2-diethylaminoethoxy) phenyl] acrylonitrile
α-(4,5-dimethoxy-2-nitrophenyl)-β-(2-pyrrolyl) acrylonitrile
α-(4,5-dimethoxy-2-nitrophenyl)-β-(1-methyl-2-pyrrolyl) acrylonitrile
α-(4,5-dimethoxy-2-nitrophenyl)-β-(2-thienyl) acrylonitrile
α-(4,5-dimethoxy-2-nitrophenyl)-β-(2-furyl) acrylonitrile
α-(4,5-dimethoxy-2-nitrophenyl)-β-(cyclohexyl) acrylonitrile
α-(4,5-dimethoxy-2-nitrophenyl)-β-(4-cyanophenyl) acrylonitrile
α-(4,5-dimethoxy-2-nitrophenyl)-β-(p-methylaminophenyl) acrylonitrile
α-(4,5-dimethoxy-2-nitrophenyl)-β-(p-trifluoromethylphenyl) acrylonitrile
α-(4,5-dimethoxy-2-nitrophenyl)-β-(p-aminophenyl) acrylonitrile and corresponding product recovered is:

α-(4,5-dimethoxy-2-aminophenyl)-β-(3-pyridyl) acrylonitrile
α-(4,5-dimethoxy-2-aminophenyl)-β-(2-pyridyl) acrylonitrile
α-(4,5-dimethoxy-2-aminophenyl)-β-(p-dimethylaminophenyl) acrylonitrile
α-(4,5-dimethoxy-2-aminophenyl)-β-[p-(2-diethylaminoethoxy) phenyl] acrylonitrile
α-(4,5-dimethoxy-2-aminophenyl)-β-(2-pyrrolyl) acrylonitrile
α-(4,5-dimethoxy-2-aminophenyl)-β-(1-methyl-2-pyrrolyl) acrylonitrile
α-(4,5-dimethoxy-2-aminophenyl)-β-(2-thienyl) acrylonitrile
α-(4,5-dimethoxy-2-aminophenyl)-β-(2-furyl) acrylonitrile
α-(4,5-dimethoxy-2-aminophenyl)β-(cyclohexyl) acrylonitrile α-(4,5-dimethoxy-2-aminophenyl)-β-(4-cyanophenyl) acrylonitrile α-(4,5-dimethoxy-2-aminophenyl)-β-(p-methylaminophenyl) acrylonitrile α-(4,5-dimethoxy-2-aminophenyl)-β-(p-trifluoromethylphenyl) acrylonitrile α-(4,5-dimethoxy-2-aminophenyl)-β-(p-aminophenyl) acrylonitrile Example XXXVIII A solution of one of the following:

α-(4,5-dimethoxy-2-nitrophenyl)-β-(3-pyridyl) acrylonitrile

α-(4,5-dimethoxy-2-nitrophenyl)-β-(4-pyridyl) acrylonitrile

α-(4,5-dimethoxy-2-nitrophenyl)-β-(2-pyridyl) acrylonitrile

α-(4,5-dimethoxy-2-nitrophenyl)-β-(4-diethylaminophenyl) acrylonitrile

α-(4,5-dimethoxy-2-nitrophenyl)-β-[p-(2-diethylaminoethoxy) phenyl] acrylonitrile α-(4,5-dimethoxy-2-nitrophenyl)-β-2(p-diethylaminophenyl) acrylonitrile α-(4,5-dimethoxy-2-nitrophenyl)-β-(p-aminophenyl) acrylonitrile α-(4,5-dimethoxy-2-nitrophenyl)-β-(p-methylaminophenyl) acrylonitrile and an equivalent amount of methyl iodide in dimethoxyethane is allowed to reflux for 4 hours. The corresponding methiodide derivative is recovered.

Example XXXIX

A solution of one of the following:

α-(4,5-dimethoxy-2-aminophenyl)-β-(3-pyridyl) acrylonitrile

α-(4,5-dimethoxy-2-aminophenyl)-β-(4-pyridyl) acrylonitrile

α-(4,5-dimethoxy-2-aminophenyl)-β-(2-pyridyl) acrylonitrile

α-(4,5-dimethoxy-2-aminophenyl)-β-(4-diethylaminophenyl) acrylonitrile

α-(4,5-dimethoxy-2-aminophenyl)-β-[p-(2-diethylaminoethoxy) phenyl] acrylonitrile α-(4,5-dimethoxy-2-aminophenyl)-β-(2-pyrrolyl) acrylonitrile α-(4,5-dimethoxy-2-aminophenyl)-β-(1-methyl-2-pyrrolyl) acrylonitrile α-(4,5-dimethoxy-2-aminophenyl)-β-2-(p-diethylaminophenyl) acrylonitrile α(4,5-dimethoxy-2-aminophenyl)-β-(p-aminophenyl) acrylonitrile α-(4,5-dimethoxy-2-aminophenyl)-β-(p-methylaminophenyl) acrylonitrile and an equivalent amount of methyl iodide in dimethoxyethane is refluxed for four hours. The corresponding methiodide is recovered.

Example XL

Acid addition salts of the β-substituted-α-(4,5-dimethoxy-2-nitrophenyl) acrylontriles and the β-substituted-α-(4,5-dimethoxy-2-aminophenyl) acrylonitriles of this invention wherein a basic nitrogen is present are prepared by reacting the nitrile in a suitable solvent such as ether with the acid, for example hydrogen chloride in ether. Other suitable acids are employed in place of hydrogen chloride in ether to produce corresponding acid addition salts.

What is claimed is:

1. α-(4,5 - dimethoxy - 2- nitrophenyl) - β - (1,2,3,6-tetrahydro-1-methyl-4-pyridyl) acrylonitrile.

2. α-(4,5 - dimethoxy - 2 - aminophenyl) - β - (1-methyl-4-piperidyl) acrylonitrile.

3. α-(4,5 - dimethoxy - 2 - nitrophenyl) - β - (2-pyrroyl) acrylonitrile.

4. α-(4,5 - dimethoxy - 2 - nitrophenyl) - β - (1-methyl-2-pyrroyl) acrylonitrile.

5. α-(4,5 - dimethoxy - 2 - nitrophenyl) - β - (2-thienyl) acrylonitrile.

6. α-(4,5 - dimethoxy - 2 - nitrophenyl) - β - (2-furyl) acrylonitrile.

7. A member of the group consisting of a β-substituted-α - (4,5 - dimethoxy - 2 - nitrophenyl)acrylonitrile and a β-substituted - α - (4,5 - dimethoxy - 2 - aminophenyl) acrylonitrile having the formula

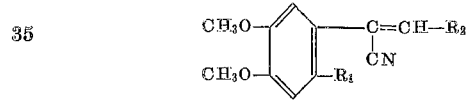

wherein $R_1$ is a member of the group consisting of nitro and amino, and $R_2$ is a member of the group consisting of pyrrolyl, N-lower alkylpyrrolyl, and N-lower alkylpiperidyl, and the non-toxic acid addition salt and lower alkyl quaternary ammonium derivative thereof.

References Cited

Walker: J. Am. Chem. Soc., vol. 78, pp. 3698–3701 (1956), QD 1 A 5.

Lavagnino: J. Org. Chem. Soc., vol. 22, pp. 457–458 (1957), QD 241 J. 6.

JOHN D. RANDOLPH, *Primary Examiner.*

WALTER A. MODANCE, *Examiner.*

H. I. MOATZ, *Assistant Examiner.*